(12) United States Patent
    Lull et al.

(10) Patent No.: US 10,334,141 B2
(45) Date of Patent: Jun. 25, 2019

(54) VEHICLE CAMERA SYSTEM

(71) Applicants: DENSO International America, Inc., Southfield, MI (US); DENSO CORPORATION, Kariya-shi, Aichi-ken (JP)

(72) Inventors: Joseph Lull, South Haven, MI (US); Shawn Hunt, Pinckney, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 86 days.

(21) Appl. No.: 15/605,435

(22) Filed: May 25, 2017

(65) Prior Publication Data
    US 2018/0343399 A1     Nov. 29, 2018

(51) Int. Cl.
    *H04N 5/265*   (2006.01)
    *G06K 9/46*    (2006.01)
    *G06K 9/62*    (2006.01)
    *H04N 1/60*    (2006.01)
    *H04N 5/235*   (2006.01)

(52) U.S. Cl.
    CPC ......... *H04N 1/6016* (2013.01); *H04N 5/2355* (2013.01)

(58) Field of Classification Search
    None
    See application file for complete search history.

(56) References Cited

U.S. PATENT DOCUMENTS

| 7,239,757 | B2 | 7/2007 | Kang et al. |
| 7,483,486 | B2 | 1/2009 | Mantiuk et al. |
| 8,014,445 | B2 | 9/2011 | Segall et al. |
| 9,813,617 | B2 * | 11/2017 | Venkataraman ..... H04N 13/243 |
| 10,009,551 | B1 * | 6/2018 | Adcock .................. H04N 5/247 |
| 10,084,967 | B1 * | 9/2018 | Somasundaram ... H04N 5/2353 |
| 2011/0069189 | A1 * | 3/2011 | Venkataraman ........................... H01L 27/14618 348/218.1 |

(Continued)

FOREIGN PATENT DOCUMENTS

WO   WO-2012172460 A1   12/2012

OTHER PUBLICATIONS

Sen et al., Proceeding of SIGGRAPH Asia 2012, ACM Transactions on Graphics (TOG), vol. 31, No. 6, Art. 203, Nov. 2012, pp. 1-11. (Year: 2012).*

*Primary Examiner* — Reza Aghevli
(74) *Attorney, Agent, or Firm* — Harness, Dickey & Pierce, P.L.C.

(57) ABSTRACT

A method for creating high dynamic range (HDR) images with an HDR camera system. The method includes capturing with a camera of the HDR camera system a plurality of camera exposures. The method also includes creating a first HDR image from a first subset of the plurality of camera exposures, each exposure of the first subset having a different exposure value. The method further includes creating a second HDR image from a second subset of the plurality of camera exposures, the second subset including at least one exposure from the first subset and at least one additional exposure captured more recently than the exposures of the first subset, each exposure of the second subset having a different exposure value.

18 Claims, 6 Drawing Sheets

(56) References Cited

U.S. PATENT DOCUMENTS

| | | | |
|---|---|---|---|
| 2011/0080487 A1* | 4/2011 | Venkataraman | H04N 5/2253 348/218.1 |
| 2012/0069213 A1 | 3/2012 | Jannard et al. | |
| 2014/0002694 A1 | 1/2014 | Levy et al. | |
| 2014/0240549 A1* | 8/2014 | Seshadrinathan | H04N 5/2353 348/239 |
| 2015/0130967 A1* | 5/2015 | Pieper | H04N 5/2355 348/239 |
| 2016/0037046 A1 | 2/2016 | Nashizawa | |
| 2016/0098852 A1* | 4/2016 | Senda | H04N 5/247 382/195 |
| 2016/0212355 A1* | 7/2016 | Pouli | G06T 5/50 |
| 2016/0247325 A1* | 8/2016 | Yu | A61B 8/5238 |
| 2017/0064213 A1* | 3/2017 | Windmark | H04N 5/265 |
| 2017/0332000 A1* | 11/2017 | Wang | H04N 5/2355 |
| 2018/0198970 A1* | 7/2018 | Seshadrinathan | H04N 5/2355 |
| 2018/0276482 A1* | 9/2018 | Singh | G06K 9/00785 |

* cited by examiner

VEHICLE CAMERA SYSTEM

FIELD

The present disclosure relates to a vehicle camera system.

BACKGROUND

This section provides background information related to the present disclosure, which is not necessarily prior art.

More and more vehicles are being outfitted with cameras to detect lane markers, obstacles, signage, infrastructure, other vehicles, pedestrians, etc. The cameras can be used, for example, to enhance safe vehicle operation and/or to guide the vehicle during autonomous driving. While current cameras are suitable for their intended use, they are subject to improvement.

With respect to high dynamic range (HDR) imaging, multiple images taken with a single camera are processed and combined into a single HDR composite image. Each one of the multiple images typically has a different exposure value (EV) with a different amount of light, such as a first image that is normally exposed, a second image that is under exposed, and a third image that is overexposed. The images are aligned and then combined to obtain a final image. Such HDR processing of multiple images is computationally burdensome, especially for an autonomous vehicle system traveling at highway speeds. The present teachings advantageously include camera systems and methods that facilitate HDR processing and enhance the object detection capabilities of vehicle camera systems, for example. One skilled in the art will appreciate that the present teachings provide numerous additional advantages and unexpected results in addition to those set forth herein.

SUMMARY

This section provides a general summary of the disclosure, and is not a comprehensive disclosure of its full scope or all of its features.

The present teachings provide for a method for creating high dynamic range (HDR) images with an HDR camera system. The method includes capturing with a camera of the HDR camera system a plurality of camera exposures. The method also includes creating a first HDR image from a first subset of the plurality of camera exposures, each exposure of the first subset having a different exposure value. The method further includes creating a second HDR image from a second subset of the plurality of camera exposures, the second subset including at least one exposure from the first subset and at least one additional exposure captured more recently than the exposures of the first subset, each exposure of the second subset having a different exposure value.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 3 illustrates a method according to the present teachings for determining an optimal number of camera exposures to create a high dynamic range (HDR) image with;

Corresponding reference numerals indicate corresponding parts throughout the several views of the drawings.

DETAILED DESCRIPTION

Example embodiments will now be described more fully with reference to the accompanying drawings.

Figure 1:
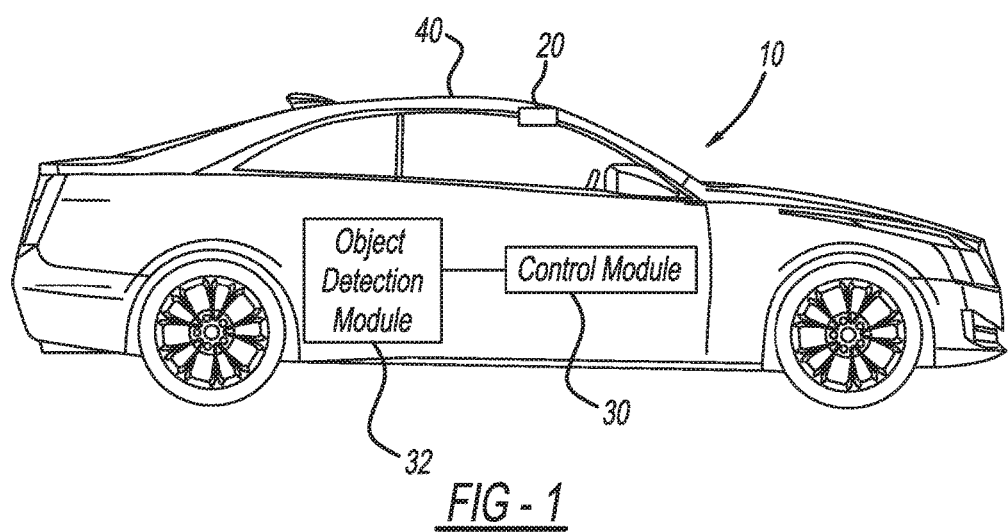
FIG. 1 illustrates a camera system according to the present teachings included with an exemplary vehicle.

With initial reference to FIG. 1, a high dynamic range (HDR) camera or imaging system in accordance with the present teachings is illustrated at reference numeral 10. The HDR camera system 10 generally includes an HDR camera 20 and a control module 30. Although the HDR camera system 10 is illustrated as included with a passenger vehicle 40, the HDR camera system 10 can be included with any suitable type of vehicle. For example, the HDR camera system 10 can be included with any suitable recreational vehicle, mass transit vehicle, construction vehicle, military vehicle, motorcycle, construction equipment, mining equipment, watercraft, aircraft, etc. Further, the camera system 10 can be used with any suitable non-vehicular applications to enhance the ability of the HDR camera 20 to image objects of interest.

The HDR camera 20 can be any suitable camera capable of imaging objects of interest. For example, the camera 20 can be any suitable visual light camera. Types of cameras may include PC webcams, industrial cameras such as GigE and USB3 cameras, point-and-shoot cameras, and advanced DSLR cameras. This may also include cameras that image different areas of the light spectrum such as IR (infrared), NIR (near-infrared), FIR (far-infrared), SWIR (short-wavelength infrared), and LWIR (long-wave infrared). The camera 20 can be mounted at any suitable position about the vehicle 40, such as on a roof of the vehicle 40, at a front of the vehicle 40, on a windshield of the vehicle 40, etc. The HDR camera system 10 can include any suitable number of cameras 20, although the exemplary system described herein includes a single camera 20.

As explained further herein, the control module 30 receives a plurality of exposures (sometimes referred to as camera exposures or image exposures) captured by the HDR camera 20, and combines a selection of the plurality of exposures into a single HDR image. In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 2A:
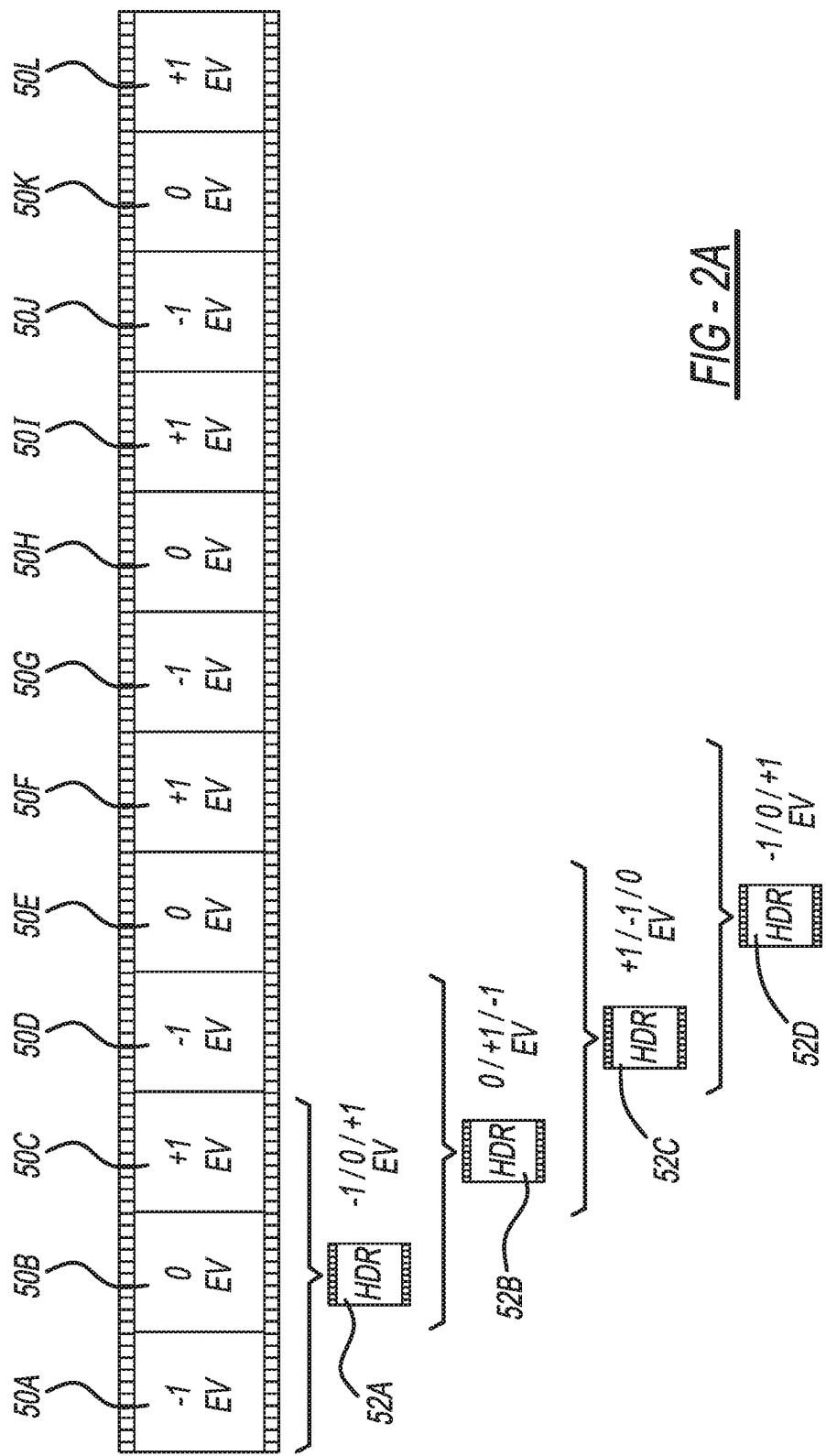
FIG. 2A illustrates a plurality of camera exposures with different exposure values, and selection of groups of the plurality of camera exposures to create multiple HDR images in accordance with the present teachings.

At least two of the plurality of exposures captured by the camera 20 have different exposure values, which vary based on the amount of light in the exposure. For example and as illustrated in FIG. 2A, a plurality of camera exposures captured by the HDR camera 20 are illustrated at references numerals 50A-50L. The exposures 50A-50L are arranged in chronological order. Thus the exposure 50A was captured by the HDR camera 20 before the exposure 50B. The exposure 50C was captured by the HDR camera 20 after the exposure 50B was captured, and prior to exposure 50D being captured. Exposure 50L was captured by the HDR camera 20 after each one of the exposures 50A-50K were captured.

Exposure 50B has an exposure value of 0, and is thus a base exposure. Exposures 50E, 50H, and 50K also have exposure values of 0, and are thus also base exposures. Exposure 50A has an exposure value of −1, which indicates that the exposure 50A has less light, or is darker than, the base exposure 50B. The exposure 50A can have any suitable amount of light less than the base exposure 50B, such as half the amount of light as the base exposure 50B. The exposure 50C has an exposure value of +1, which indicates that the exposure 50C has more light than the base exposure 50B. The exposure 50C can have any suitable amount of light that is greater than the light of the base exposure 50B, such as twice the amount of light as the base exposure 50B. Exposures 50F, 50I, and 50L each have exposure values of +1, and thus each have an amount of light similar to exposure 50C. Exposures 50D, 50G, and 50J each have exposure values of −1, and thus each have an amount of light similar to exposure 50A.

As explained further herein, the control module 30 combines two or more of the exposures 50A-50L having different exposure values into a single HDR image. In the example of FIG. 2A, three of the exposures 50A-50L having different exposure values are combined into a single HDR image. Specifically, exposures 50A, 50B, and 50C are combined by the control module 30 into a single HDR image 52A. The exposures 50A, 50B, and 50C are thus a first subset of the plurality of camera exposures 50A-50L. Each of these exposures 50A, 50B, and 50C of this first subset have different exposure values.

After creating the first HDR image 52A, the control module 30 creates a second HDR image 52B. The second HDR image 52B includes at least one of the exposures 50B and 50C of the first subset, and replaces at least the exposure 50A with more recently captured exposure 50D, which has an exposure value that is the same as the exposure value of 50A. Thus in the example of FIG. 2A, the second HDR image 52B includes exposures 50B and 50C, and replaces exposure 50A with more recently captured exposure 50D. In some applications, the second HDR image 52B can include exposure 50C, exposure 50D, and exposure 50E. Exposures 50D and 50E can thus replace exposures 50A and 50B respectively.

The control module 30 is further configured to create a third HDR image 52C, which in the example of FIG. 2A includes exposures 50C, 50D, and 50E. A fourth HDR image 52D created by the control module 30 includes exposures 50D, 50E, and 50F. As explained further herein, the control module 30 can configure the HDR camera 20 to capture any suitable number of exposures including any suitable number of exposure values. Furthermore, the control module 30 can be configured to create HDR images including any suitable number of exposures, and retain any suitable number of exposures from one HDR image to the next, such as from HDR image 52A to HDR image 52B.

Figure 2B:
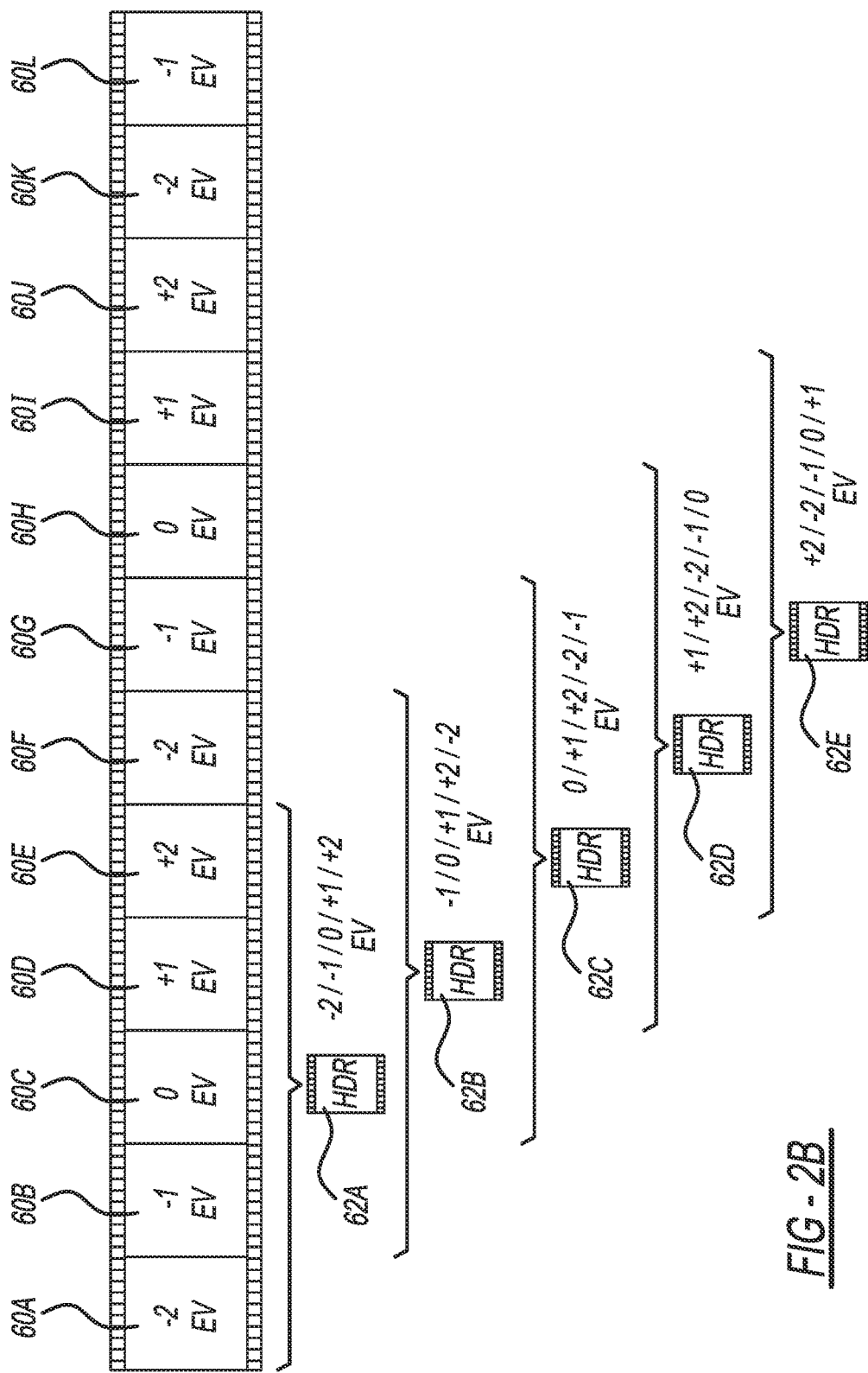
FIG. 2B illustrates additional camera exposures with different exposure values, and selection of groups of the plurality of camera exposures to create multiple HDR images in accordance with the present teachings.

FIG. 2B illustrates an example where the control module 30 has configured the HDR camera 20 to capture a plurality of camera exposures 60A-60L including additional exposure values as compared to exposures 60A-60L of FIG. 2A. Specifically, in addition to including the exposure values of exposures 50A-50L described above, exposure values of −2 and +2 are included. For example, exposure 60A has an exposure value of −2, which indicates that exposure 60A is darker than exposure 60B having an exposure value of −1, such as twice as dark as the exposure 60B. Exposure 60E having an exposure value of +2 is brighter than exposure 60D having an exposure value of +1. For example, exposure 60E can include twice as much light as exposure 60D. Exposure 60F includes an exposure value of −2 and is darker than, such as twice as dark as, the exposure 60G having an exposure value of −1. Exposure 60J has an exposure value of +2, and thus has more light than exposure 60I, such as twice as much light as exposure 60I. Exposure 60K has an exposure value of −2, and thus has less light than exposure 60L having an exposure value of −1, such as half the amount of light as the exposure 60L having an exposure value of −1.

In the example of FIG. 2B, the control module 30 is configured to create HDR images 62A-62E from exposures 60A-60L, which are arranged in chronological order in FIG. 2B from left to right. Each one of the HDR images 62A-62E includes five exposures having different exposure values. Specifically, the control module 30 is configured to create a first HDR image 62A including exposures 60A-60E, which constitutes a first subset of the plurality of exposures 60A-60L. The control module 30 is configured to create a second HDR image 62B, which includes at least one of the exposures 60A-60E used to create HDR image 62A. In the example illustrated, the control module 30 creates the HDR image 62B from exposures 60B-60F. More recently captured exposure 60F replaces exposure 60A. The control module 30 is further configured to form HDR images 62C, 62D, and 62E, each of which includes four of the exposures used to create the previous HDR image, plus one more recently captured exposure having an exposure value that is the same as the oldest exposure of the previously captured HDR image being replaced. Although the example of FIG. 2B illustrates the HDR images 62A-62E being formed from four exposures used to create a prior HDR image plus a single more recently captured exposure, the control module 30 can be configured to create an HDR image using any suitable number of exposures used to create a prior HDR image, plus any suitable number of more recently captured exposures.

By creating HDR images that retain at least one exposure from a previously created HDR image, the control module 30 can advantageously accelerate the creation of HDR images from a plurality of camera exposures for input to any suitable object detection module 32, such as a lane detection module. For example, when the vehicle 40 is traveling at a high rate of speed, the exposures captured by the camera 20 must be quickly processed into HDR images for input to a vehicle lane detection module so that the object detection system can readily identify the location of the lane markers.

With continued reference to FIGS. 1, 2A, and 2B, and additional reference to FIG. 3, a method 110 according to the present teachings for setting the number of camera exposures included in each of the HDR images created by the control module 30 (such as HDR images 52A-52D and 62A-62E) will now be described. With initial reference to block 112 of FIG. 3, the control module 30 accesses a trained model including training image data. The trained model can be provided in any suitable manner, such as by a developer, manufacturer, distributor, etc. of the HDR imaging system 10. The trained model can be generated in any suitable manner, such as by way of the method 210 illustrated in FIG. 4.

Figure 4:
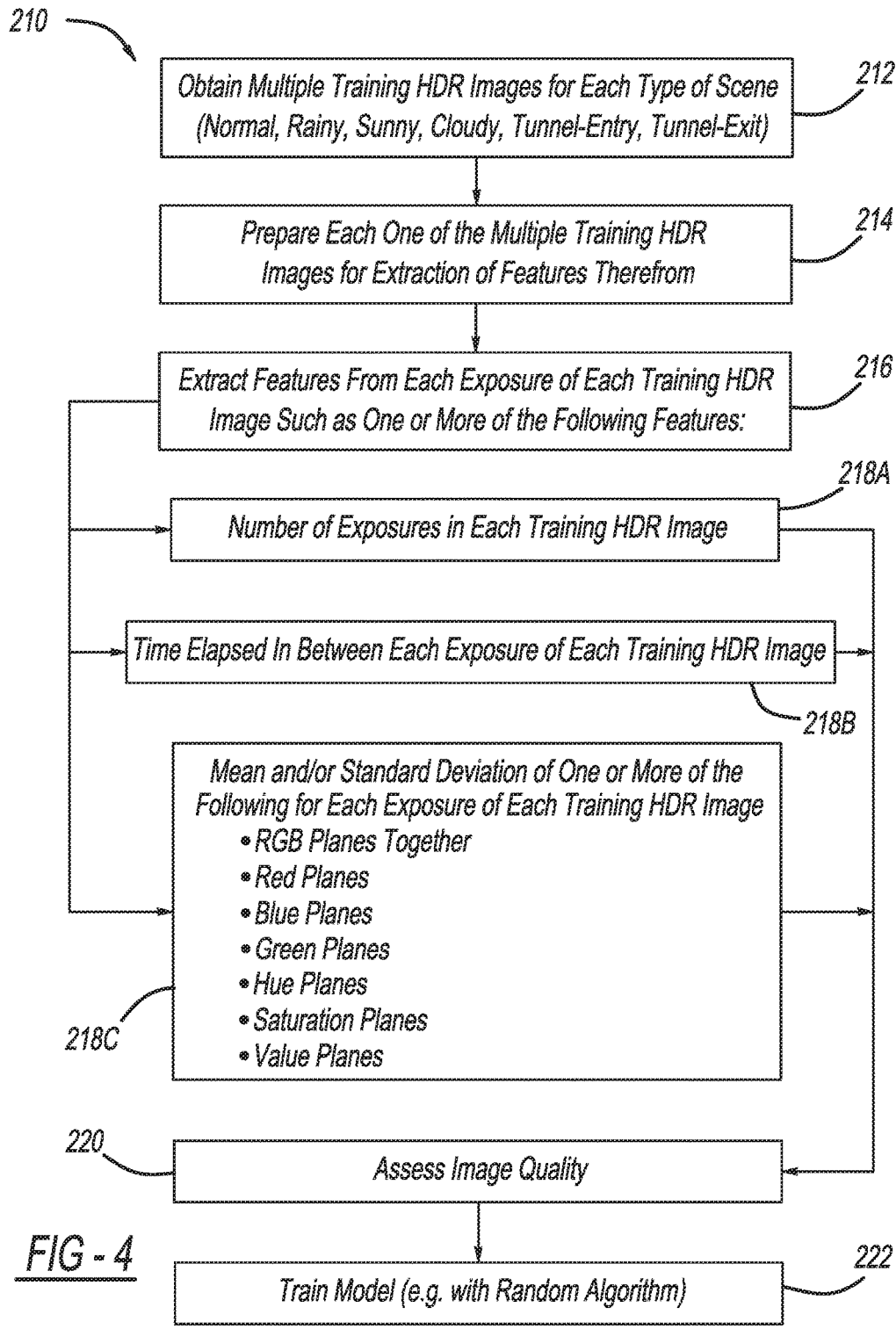
FIG. 4 illustrates a method according to the present teachings for creating a trained model of training HDR image data.

With reference to block 212 of the method 210 of FIG. 4, multiple training HDR images for various types of scenes that are typically encountered are captured in any suitable manner, such as by the developer, manufacturer, distributor, etc. of the HDR imaging system 10. For example, 3,000 images can be captured for each one of the following scenes under different conditions, such as different light and visibility conditions: normal scene; rainy scene; snowy scene; sunny scene; cloudy scene; tunnel enter scene; and tunnel exit scene. With reference to block 214, each one of the training HDR images is converted into any suitable format to enable the extraction of various features therefrom. For example, color versions of the training HDR images can be transformed into grayscale images, multiple Gaussian blurs are performed on the grayscale images, and a difference of the Gaussian blurs is taken. Each one of the training HDR images may also be converted from color versions to hue, saturation, and value (HSV) images.

At block 216, various features are extracted from each camera exposure of each one of the training HDR images. Any suitable features can be extracted, such as one or more of the following: number of exposures in each training HDR image (block 218A); time elapsed between each exposure of each training HDR image (218B); mean and/or standard deviation of one or more planes for each exposure of each training HDR image (218C). Exemplary planes include red, green, blue planes together, red planes, blue planes, green planes, hue planes, saturation planes, and value planes. With reference to block 220, the image quality of each training HDR image (the assembled training HDR image and/or each exposure used to create the training HDR image) is assessed in any suitable manner. For example, each training HDR image (the assembled training HDR image and/or each exposure used to create the training HDR image) can be viewed and graded with respect to quality (such as good or bad quality) by the developer, manufacturer, distributor, etc. of the HDR imaging system 10. The grading can occur at any suitable time during the method 210, and need not occur just before block 222 as illustrated in FIG. 4. After the features described above, or any other suitable features, have been extracted from each exposure of each training HDR image and the image grading is completed, the method 210 proceeds to block 222 where the features and image grading are used to train the model of training image data with any suitable algorithm, such as a random forest algorithm.

Figure 3:
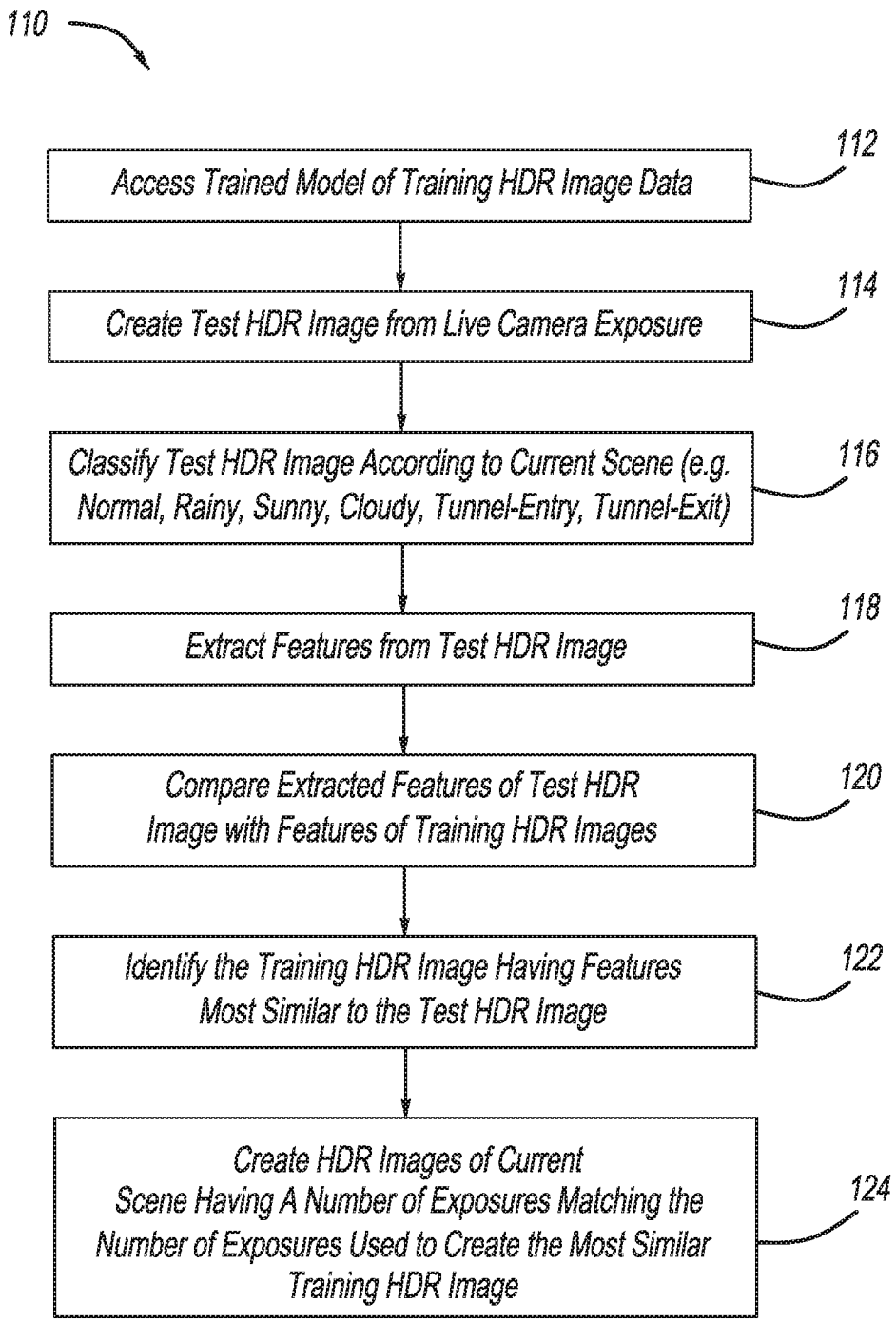

With renewed reference to the method 110 of FIG. 3, after the control module 30 accesses the trained model of training image data (created and trained in accordance with method 210 of FIG. 4, for example), the control module 30 proceeds to block 114 of FIG. 3. At block 114, the control module 30 retrieves live camera exposures from the camera 20 and creates a test HDR image therefrom, including any suitable number of exposures, such as three of the exposures 50A-50L as illustrated in FIG. 2A, or five of the exposures 60A-60L as illustrated in FIG. 2B. With reference to block 116, the control module 30 classifies the test HDR image according to the scene captured, such as a normal scene, raining scene, sunny scene, cloudy scene, tunnel-enter scene, or tunnel-exit scene. At block 118, the test HDR image is prepared for features to be extracted therefrom, such as in the same manner explained previously in conjunction with the description of block 214 with respect to the training HDR images. Then, relevant features are extracted from the test HDR image, such as from each exposure thereof. Any suitable features can be extracted, such as at least the features detailed in block 216A, 216B, and 216C of the method 210.

At block 120, the extracted features of the test HDR image are compared with features of the training images of the trained model of training image data. At block 122, the training HDR image having features most similar to the test HDR image (and of the same scene), and having a satisfactory image quality as assessed at block 220, is identified. With reference to block 124, the control module 30 is set such that the HDR images created thereby consist of a number of exposures (such as three camera exposures in the example of FIG. 2A, or five camera exposures in the example of FIG. 2B) matching the number of exposures included with the training HDR image that is determined to be most similar to the test HDR image at block 122. As a result, the control module 30 will advantageously create HDR images that are of a clarity most suitable for the present conditions. The method 110 can be regularly performed, such as by the control module 30 for example, to make sure that the HDR images of the highest quality are generated as environmental conditions change.

Figure 5:
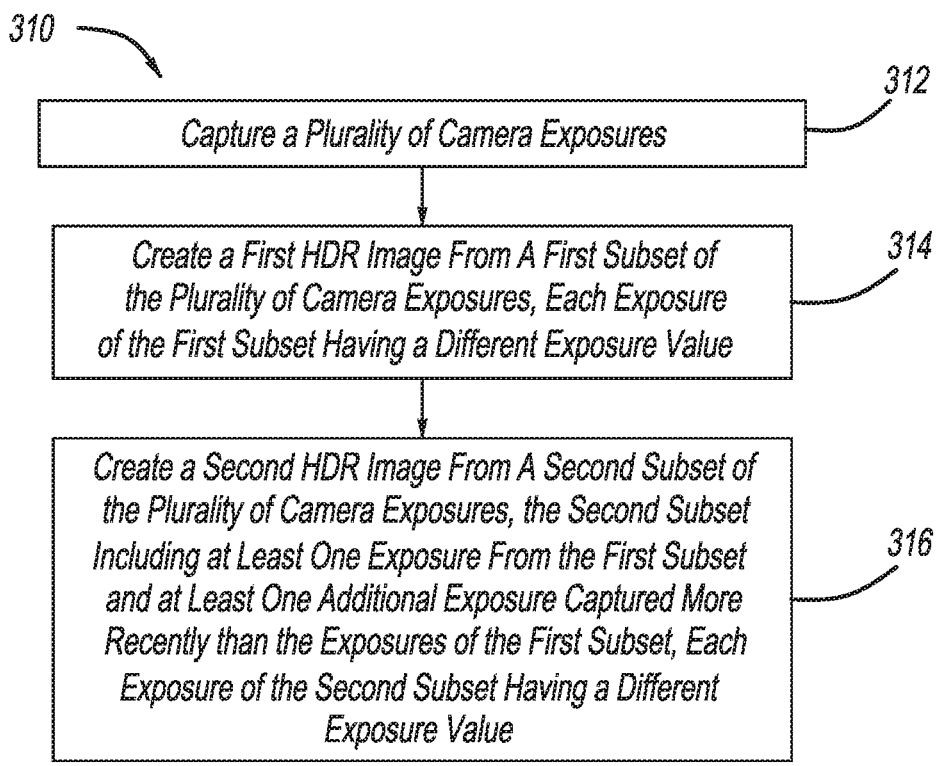
FIG. 5 illustrates a method according to the present teachings for selecting camera exposures to use for creating an HDR image from a plurality of camera exposures having different exposure values.

With reference to FIG. 5, a method 310 according to the present teachings for creating HDR images having a number of exposures matching the number of exposures used to create the training HDR image determined to be most similar to the test HDR image (as determined at block 124 of method 110 for example) is illustrated. Although the method 310 is described as using the system 10 and the methods 110 and 210 of the present teachings, the method 310 can be performed using any other suitable systems and methods.

With initial reference to block 312 of the method 310, a plurality of camera exposures are captured, such as the exposures 50A-50L (FIG. 2A) or 60A-60L (FIG. 2B). With reference to block 314, the control module 30 or any other suitable module, creates a first HDR image (such as the HDR image 52A of FIG. 2A or the HDR image 62A of FIG. 2B) from a first subset of the plurality of camera exposures. Each camera exposure of the first subset has a different exposure value. With reference to block 316, the control module 30 or any other module creates a second HDR image (such as the HDR image 52B of FIG. 2A or the HDR image 62B of FIG. 2B) from a second subset of the plurality of camera exposures. The second subset includes at least one exposure from the first subset of exposures, and at least one additional exposure captured more recently than the exposures of the first subset. Each exposure of the second subset has a different exposure value. By creating HDR images that retain at least one exposure from a previously created HDR image, the present teachings can advantageously accelerate the creation of HDR images from a plurality of camera exposures for input to any suitable object detection module, such as a lane detection module. For example, when a vehicle is traveling at a high rate of speed, the exposures captured by the HDR camera must be quickly processed into HDR images for input to a vehicle lane detection module so that the object detection system can readily identify the location of the lane markers.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for creating high dynamic range (HDR) images with an HDR camera system, the method comprising:
    capturing with a camera of the HDR camera system a plurality of camera exposures;
    creating a first HDR image from a first subset of the plurality of camera exposures, each camera exposure of the first subset having a different exposure value;
    creating a second HDR image from a second subset of the plurality of camera exposures, the second subset including at least one exposure from the first subset and at least one additional exposure captured more recently than the exposures of the first subset, each exposure of the second subset having a different exposure value;
    creating a test HDR image;
    comparing the test HDR image to a plurality of HDR training images that were previously captured;
    determining which one of the plurality of HDR training images is most similar to the test HDR image; and
    setting the number of camera exposures to include with the HDR images of the HDR camera system, including the first and second HDR images, to be equal to the one of the plurality of HDR training images that is most similar to the test HDR image.

2. The method of claim 1, wherein the second subset of the plurality of camera exposures has an identical number of camera exposures as the first subset of the plurality of camera exposures.

3. The method of claim 2, wherein the second subset of the plurality of camera exposures includes the first subset of the plurality of camera exposures without an oldest exposure of the first subset of the plurality of camera exposures; and
    wherein in the second subset of the plurality of camera exposures the at least one additional exposure captured more recently than the exposures of the first subset is a single camera exposure that replaces the oldest exposure.

4. The method of claim 1, further comprising creating the first HDR image and creating the second HDR image with a control module of the HDR camera system.

5. The method of claim 1, wherein the first subset of the plurality of camera exposures includes a base exposure, a first lighter exposure having more light than the base exposure, and a first darker exposure having less light than the base exposure.

6. The method of claim 5, wherein the first subset of the plurality of camera exposures includes a second lighter exposure having more light than the first lighter exposure, and a second darker exposure having less light than the first darker exposure.

7. The method of claim 5, wherein the second subset of the plurality of exposures includes:
the base exposure and the first lighter exposure; and
the at least one additional exposure captured more recently than the exposures of the first subset, which is a single exposure having an exposure value equal to the first darker exposure and replaces the first darker exposure.

8. The method of claim 1, further comprising classifying the test HDR image as including one of the following scenes: normal; rainy; snowy; sunny; cloudy; tunnel-enter; and tunnel-exit.

9. The method of claim 1, further comprising extracting image features from the test HDR image;
wherein determining which one of the plurality of HDR training images is most similar to the test HDR image includes comparing the extracted image features extracted from the test HDR image with image features extracted from the plurality of training images.

10. The method of claim 9, wherein the extracted image features include one or more of the following: number of camera exposures; time elapsed between each camera exposure; and mean and/or standard deviation of one or more of red green blue planes together, red planes, blue planes, green planes, hue planes, saturation planes, and/or value planes.

11. The method of claim 9, wherein the test HDR image and at least one of the plurality of HDR training images is prepared for extraction of features therefrom by:
transforming a color version thereof to a grayscale image, performing multiple Gaussian blurs on the grayscale image, and taking a difference of the Gaussian blurs; and/or
transforming the color version thereof to an HSV (hue, saturation, and value) image.

12. A high dynamic range (HDR) imaging system comprising:
a camera configured to capture a plurality of camera exposures of an area; and
a control module configured to:
create a first HDR image from a first subset of the plurality of camera exposures, each camera exposure of the first subset having a different exposure value;
create a second HDR image from a second subset of the plurality of camera exposures, the second subset including at least one exposure from the first subset and at least one additional exposure captured more recently than the exposures of the first subset, each exposure of the second subset having a different exposure value; and
determine how many of the plurality of camera exposures to include with the HDR images of the HDR camera system, including the first HDR image and the second HDR image, by:
creating a test HDR image;
comparing the test HDR image to a plurality of HDR training images that were previously captured;
determining which one of the plurality of HDR training images is most similar to the test HDR image; and
setting the number of camera exposures to include with the HDR images of the HDR camera system, including the first and second HDR images, to be equal to the one of the plurality of HDR training images that is most similar to the test HDR image.

13. The HDR imaging system of claim 12, wherein the second subset of the plurality of camera exposures has an identical number of camera exposures as the first subset of the plurality of camera exposures.

14. The HDR imaging system of claim 13, wherein the second subset of the plurality of camera exposures includes the first subset of the plurality of camera exposures without an oldest exposure of the first subset of the plurality of camera exposures; and
wherein in the second subset of the plurality of camera exposures the at least one additional exposure captured more recently than the exposures of the first subset is a single camera exposure that replaces the oldest exposure.

15. The HDR imaging system of claim 12, wherein the first subset of the plurality of camera exposures includes a base exposure, a first lighter exposure having more light than the base exposure, and a first darker exposure having less light than the base exposure.

16. The HDR imaging system of claim 15, wherein the first subset of the plurality of camera exposures includes a second lighter exposure having more light than the first lighter exposure, and a second darker exposure having less light than the first darker exposure.

17. The HDR imaging system of claim 15, wherein the second subset of the plurality of exposures includes:
the base exposure and the first lighter exposure; and
the at least one additional exposure captured more recently than the exposures of the first subset, which is a single exposure having an exposure value equal to the first darker exposure and replaces the first darker exposure.

18. The HDR imaging system of claim 12, wherein the control module is further configured to:
classify the test HDR image as including one of the following scenes: normal; rainy; snowy; sunny; cloudy; tunnel-enter; and tunnel-exit; and
extract image features from the test HDR image;
wherein determining which one of the plurality of HDR training images is most similar to the test HDR image includes comparing the extracted image features extracted from the test HDR image with image features extracted from the plurality of training images; and
wherein the extracted image features include one or more of the following: number of camera exposures; time elapsed between each camera exposure; and mean and/or standard deviation of one or more of red green blue planes together, red planes, blue planes, green planes, hue planes, saturation planes, and/or value planes.

* * * * *